Jan. 11, 1966  D. W. KORNS  3,228,639
PIPE CLAMP

Filed May 2, 1963  2 Sheets-Sheet 1

INVENTOR.
DONALD W. KORNS
By
Christy, Parmelee & Strickland
Attorney

Jan. 11, 1966  D. W. KORNS  3,228,639
PIPE CLAMP
Filed May 2, 1963  2 Sheets-Sheet 2
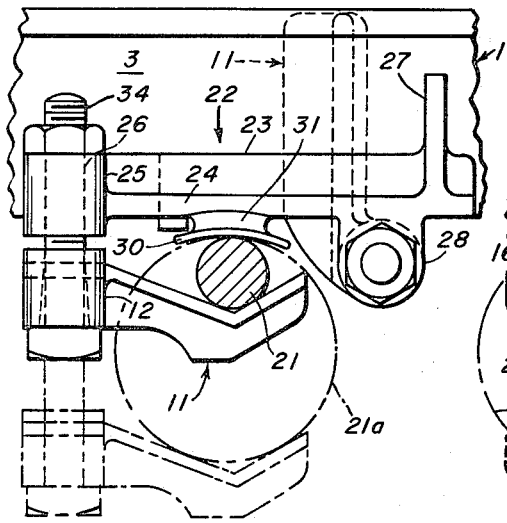
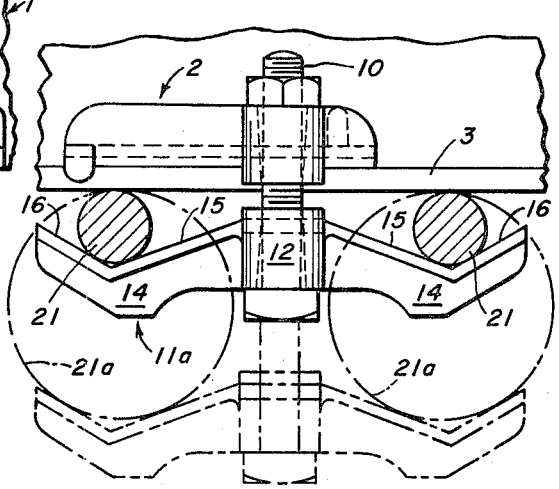
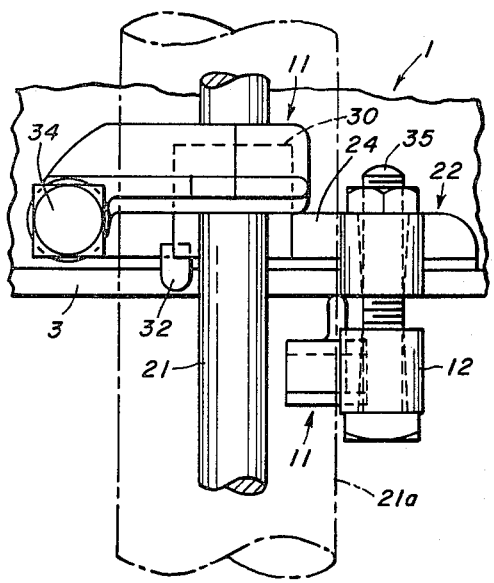
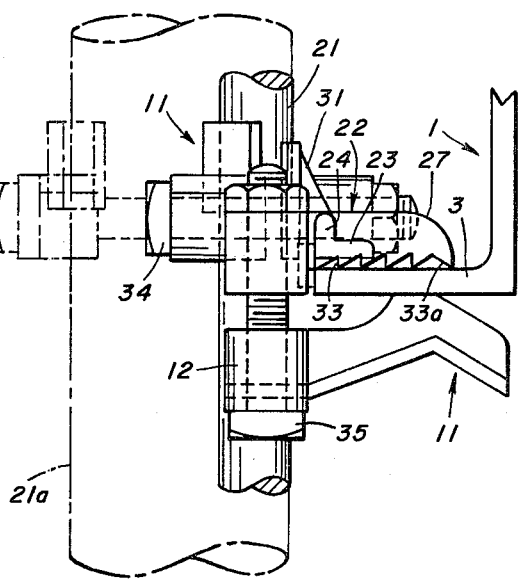
INVENTOR.
DONALD W. KORNS
Attorney

United States Patent Office 3,228,639
Patented Jan. 11, 1966

3,228,639
PIPE CLAMP
Donald W. Korns, 350 Southmont Blvd.,
Johnstown, Pa.
Filed May 2, 1963, Ser. No. 277,619
7 Claims. (Cl. 248—62)

The present invention relates to pipe clamps of the type employed in suspending pipe or conduits from structural members of industrial and other structures. More specifically, the invention is concerned with adjustable pipe clamps not requiring holes to be formed in the said structural members to which they are attached. The term "adjustable" as used herein relates to adaptation of the same clamp to a plurality of pipe sizes and the relation of the pipe to the structural member; i.e., parallel with or vertically transversely thereof.

Pipe clamps of the general type shown herein are known in the art as exemplified by U.S. Patents 1,319,652 and 1,820,229. The clamps of the present invention comprise improvements thereover both as to adjustability and ease of assembly with the pipe and supporting structural member. The clamps of the drawing are shown as being attached to a flange of an angle shaped structural member, but it is to be understood that they may also be attached to the flanges of T bars, channels and beams, as well as to the webs of such members.

One object of the invention is to provide a pipe clamp which is adjustable for reception of a plurality of pipe sizes.

Another object of the invention is to provide a pipe clamp which may be applied to a supporting structural member in a plurality of positions relative thereto.

A further object of the invention is to provide a pipe clamp which may suspend a pipe in a plurality of different positions relative to the structural member.

These and other objects of the invention will be made apparent from the following description and the drawing forming a part thereof, wherein:

FIG. 5 shows a plan view of a modified form of the clamp of FIG. 1;

FIG. 6 shows a front elevation of the clamp of FIG. 5;

FIG. 7 shows a side elevation of FIG. 6; and

FIG. 8 shows a further modification of the clamp of FIG. 2.

Figure 1:
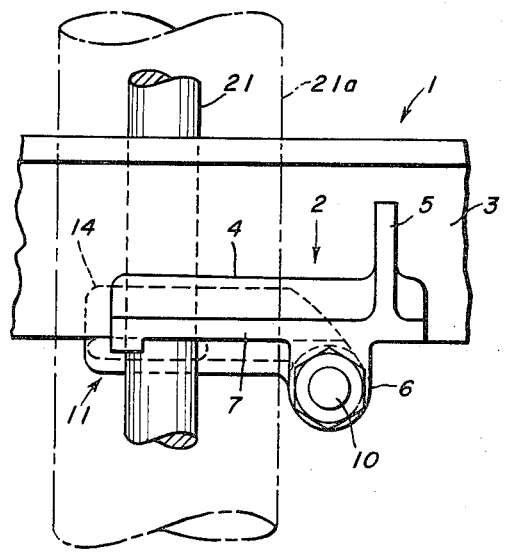
FIG. 1 shows a plan view of the assembled structural member, one form of clamp and a pipe with the latter extending transversely of the structural member to which it is attached.
Figure 2:
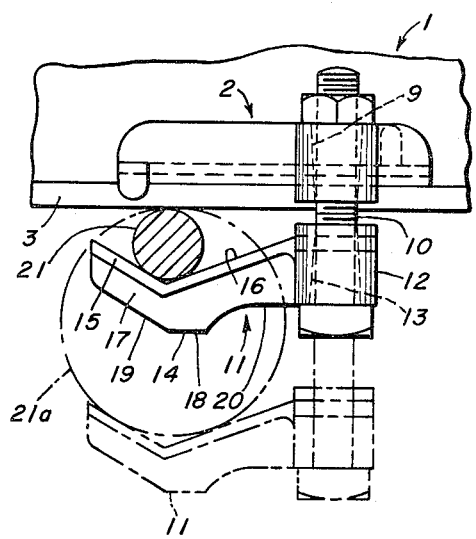
FIG. 2 shows a front elevation of the assembly of FIG. 1 and including with dot and dash lines the mode of adjustment of the clamp to different sizes of pipe.
Figure 3:
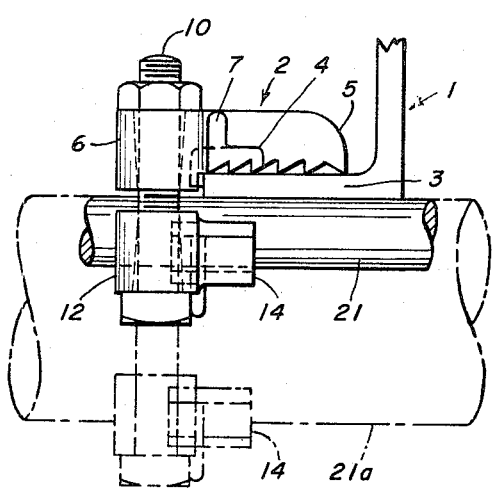
FIG. 3 shows a side elevation of the assembly of FIG. 2.

Referring now in detail to FIGS. 1 to 3 of the drawing, reference number 1 indicates generally the bottom flange and a portion of the web of an angle, Z-bar, channel I-beam, etc., comprising the structural member to which the clamp and pipe is to be attached. Reference numeral 2 indicates generally one of the clamp members overlying the supporting flange 3 of structural member 2 and provided with an elongated body portion 4, clamping rib 5, fastener receiving boss 6 and longitudinally extending reinforcing rib 7. Body portion rear rib 7 is preferably vertically disposed and the body portion 4 upper and lower faces are preferably downwardly and outwardly inclined therefrom. The rib 5 which extends outwardly from rib 7 and across the body portion 4 has at least its lower face forming an extension of the body 4 lower face. These inclined lower faces are provided with serrations 8, the outermost 8a of which initially first engages the top face of flange 3 of the structural member when the clamp is assembled thereto. Such downward inclination is primarily to effect a gripping effect by the serrations on the structural supporting surface when clamped thereto and as little as 3 degrees from the horizontal has proved satisfactory. The fastener receiving boss 6 extends above and below body portion 4 and outwardly from the rib 7 thereof. Boss 6 has a vertically extending opening 9 therethrough of a size to receive the shank of a threaded fastener 10 assembling the two clamp members together.

The clamp member 11 engaging the lower face of structural member 3 is provided with a boss 12 corresponding substantially to boss 6 of clamp member 2 and has an opening 13 therethrough to receive fastener 10. Member 11 body portion 14 is offset relative to boss 12 to underlie a portion of clamp member 2 disposed above the pipe to be suspended by the clamp. Said body portion 14 has an upper face comprised of two downwardly converging faces 15, 16, with their point of convergence underlying the vertical axis of the pipe to be supported thereby. As shown in FIG. 2 the pipe is clamped between the undersurface of the structural member flange 3 and the converging surfaces 15, 16. Surfaces 15, 16 are of substantial width to provide a bearing for the pipe engaged thereby and are reinforced by rib 17 extending therebeneath and connected to boss 12. Rib 17 extends below boss 12 and has a flattened intermediate bottom portion 18 with upwardly inclined portions 19 and 20. The portions 18, 19, 20 of rib 17 serve a special purpose, as hereinafter described with FIGS. 5 to 7 of the drawings. However, as regards FIGS. 1 to 3, rib 17 may have any suitable bottom contour.

When the clamp of FIGS. 1 to 3 is to be assembled to flange 3 for securing a pipe 21 disposed transversely of flange 3, the two clamp members 2 and 11 may be loosely assembled upon fastener 10 and disposed longitudinally relative to flange 3. The clamp member 11 underlying pipe 21 forcing it into engagement with flange 3 and clamp member 2 overlying flange 3. The nut 10a is then turned to fasten the two clamp members to the flange. As will be noted in FIGS. 1 and 2 the fastener is disposed intermediate the ends of clamp member 2 and between the pipe 21 and clamp member rib 5. As the nut 10a is turned the serration 8a of rib 5 first engages flange 3 and as pressure is applied the rib 5 deflects engaging serrations 8 with flange 3. Additionally, serrations 8 of body portion 4 also engage the flange 3. Thus the clamp member 2 has two angularly disposed points of engagement with the flange 3. The clamp body member 11 has surfaces 15, 16 so disposed as to clamp a plurality of pipe sizes to the flange 3. The form illustrated in the drawing will accommodate sizes from 3/8" to 2" diameter. This adjustment of the clamp to a plurality of pipe sizes is effected by lengthening the shank of fastener 10. The smaller size pipe is shown by full lines and the larger size pipe by dot and dash lines on FIG. 2.

Figure 4:
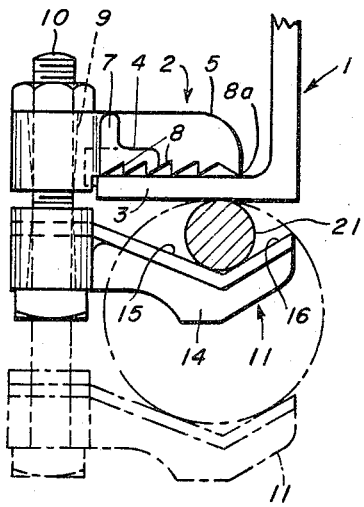
FIG. 4 shows a side elevation of the assembly of FIG. 3; with the pipe extending longitudinally of the structural supporting member.

Should it be desired to secure pipe 21 or 21a to flange 3, but disposed longitudinally rather than transversely thereof, the clamp member 11 may be rotated substantially 90 degrees as shown in FIG. 4. It will also be readily apparent that clamp member 11 may also be rotated a distance greater or lesser than 90 degrees to secure a pipe extending at different angles relative to flange 3. In all positions of clamp member 11, clamp member 2 remains as shown in FIGS. 1 to 3.

Referring now to FIG. 8 wherein is shown a modified form of the clamp of FIG. 2, the clamp member 11a is comprised of boss 12 and two laterally extending portions duplicating the portions 15, 16, 17, 20 of member 11 of FIG. 2.

Referring now to FIGS. 5 to 7 of the drawing, a further modified form of the pipe clamp is shown for holding pipes 21 and 21a when disposed in a plane vertical to the plane of flange 3 of structural member 1. The clamp is comprised of three members, a new member 22 and two of the members 11 from FIG. 2 of the drawing.

The member 22, which engages the top face of portion 3 of the structural supporting member 1, comprises a body portion 23 having a rear rib 24 extending the length thereof. A boss portion 25 is disposed transversely of one end of body portion 23 and has a fastener receiving opening 26 therein. Adjacent the opposite end of body 23 is a transversely disposed rib 27 extending from one side of rib 24 beyond the opposite side of body 23. Adjacent rib 27 and extending transversely from the opposite side of rib 24 is a boss portion 28 extending substantially parallel with rib 24 and provided with an opening 29 for reception of a fastener. Intermediate the boss portions 25 and 28 and extending outwardly from rib 24 is a pipe engaging saddle 30 disposed substantially parallel to rib 24. Saddle 30 extends above rib 24 and is connected therewith by a rib portion 31. Attached to body portion 23 and extending outwardly of rib 24 is a depending lug 32. Disposed beneath a portion of body 23 and rib 27 are a plurality of serrations 33 extending longitudinally of body 23. The lower face of such serrations being inclined downwardly and outwardly from adjacent rib 24, so that the outermost serration initially engages the upper face of flange 3 of member 1 when the clamp is mounted thereon.

As shown in FIGS. 5 and 7, a member 11 of FIG. 1 is mounted upon each fastener engaged in bosses 25 and 28. Fastener 34, extending through boss 24, has a member 11 thereon with its surfaces 15 and 16 opposing saddle 30 for embracing the pipe 21. Fastener 35, extending through boss 28 has a member 11 thereon with the body thereof underlying said member 22 with the surface 18 thereof positioned to abut the bottom face of flange 3 of structural supporting member 1.

In use, the pipe clamp of FIGS. 5 to 7 has the member 22 and inverted member 11 clamped to the flange 3. The other members 11 and saddle 30 secure the pipe 21 between them in a position vertical to the plane of flange 3. This clamp, as in FIGS. 1 to 4, may also be used to secure a plurality of different pipe sizes in place. Where necessary, a longer fastener 34 may be employed for the larger pipe sizes.

I claim:
1. An adjustable device for suspending a pipe in a plurality of positions relative to a support, comprising
 a first member having a first surface thereon adapted to overlie said support and a second surface angularly disposed to said first surface for frictionally engaging the adjacent surface of a support,
 a second member adapted to underlie a support and having a shaped surface thereon for receiving a pipe to be retained in a plurality of fixed positions relative to an overlying surface of a support, and
 means for adjustably connecting a member outwardly of said support for retaining a pipe in fixed relation to a support and for securing said first member second surface in frictional engagement with a support.
2. The device as defined in claim 1, wherein said second member is independently adjustable relative to said first member and a support whereby the pipe may be disposed at variable angles relative to a support and in the plane thereof.

3. In a clamp for securing a pipe to a support, in combination
 a first member having an elongated body portion for overlying and engaging one surface of a support,
 means at one side of said member and adjacent one end of said elongated body portion for receiving an adjustable fastener,
 a second member having an elongated body portion adapted to overlie a support and provided with a shaped surface for receiving a portion of the periphery of a pipe for retaining the pipe in fixed relation to the adjacent surface of a support,
 means on said second member for receiving an adjustable fastener, and
 an adjustable fastener extending between said members and within said means thereon for clamping both members and the pipe to a support.
4. The clamp as defined in claim 3, wherein the said second member is rotatable relative to said first named member for positioning the pipe in a plurality of positions relative to a support and beneath said first named member.
5. The clamp as defined in claim 3, wherein the first named member body portion has adjacent one end thereof an angularly disposed rib engaging the surface of a support outwardly of said body portion.
6. A clamp for securing a pipe to a support, comprising
 a first member having an elongated body portion for overlying and engaging a surface of said support,
 means adjacent one end of said body portion for receiving an adjustable fastener having its longitudinal axis disposed transversely of said body portion,
 a second means on said body portion in spaced relation to said first means for receiving a second adjustable fastener having a longitudinal axis disposed at an angle to said first named fastener,
 a shaped surface on said first member between said means thereon for engagement by a pipe to be supported,
 a second member having a shaped pipe engaging surface thereon and means on said second member for receiving an adjustable fastener,
 an adjustable fastener engaged in the first named means of the first member and in the means of the second named member for clamping the said pipe between them,
 a third member having an elongated body portion adapted to extend beneath a support and means thereon for receiving an adjustable fastener, and
 an adjustable fastener mounted in the second named means of the first member and in the said means of the third member for clamping the said first and third named members to a support.
7. The clamp as defined in claim 6 wherein the shaped pipe engaging surface of the second named member has a bottom portion provided with a surface suitable for engagement with a support when reversed and the third named member is comprised of an inverted second named member with its said bottom portion surface directed towards a support and clamped thereto.

References Cited by the Examiner
UNITED STATES PATENTS

| | | | |
|---|---|---|---|
| 1,303,346 | 5/1919 | McFeaters | 248—74 X |
| 1,877,781 | 9/1932 | Akerlund | 248—72 |
| 2,749,068 | 6/1956 | Wayman | 248—72 |
| 3,116,079 | 12/1963 | Doolittle | 248—72 X |
| 3,129,915 | 4/1964 | Budnick | 248—72 |

CLAUDE A. LE ROY, *Primary Examiner.*

FRANK L. ABBOTT, *Examiner.*